Figure 1:
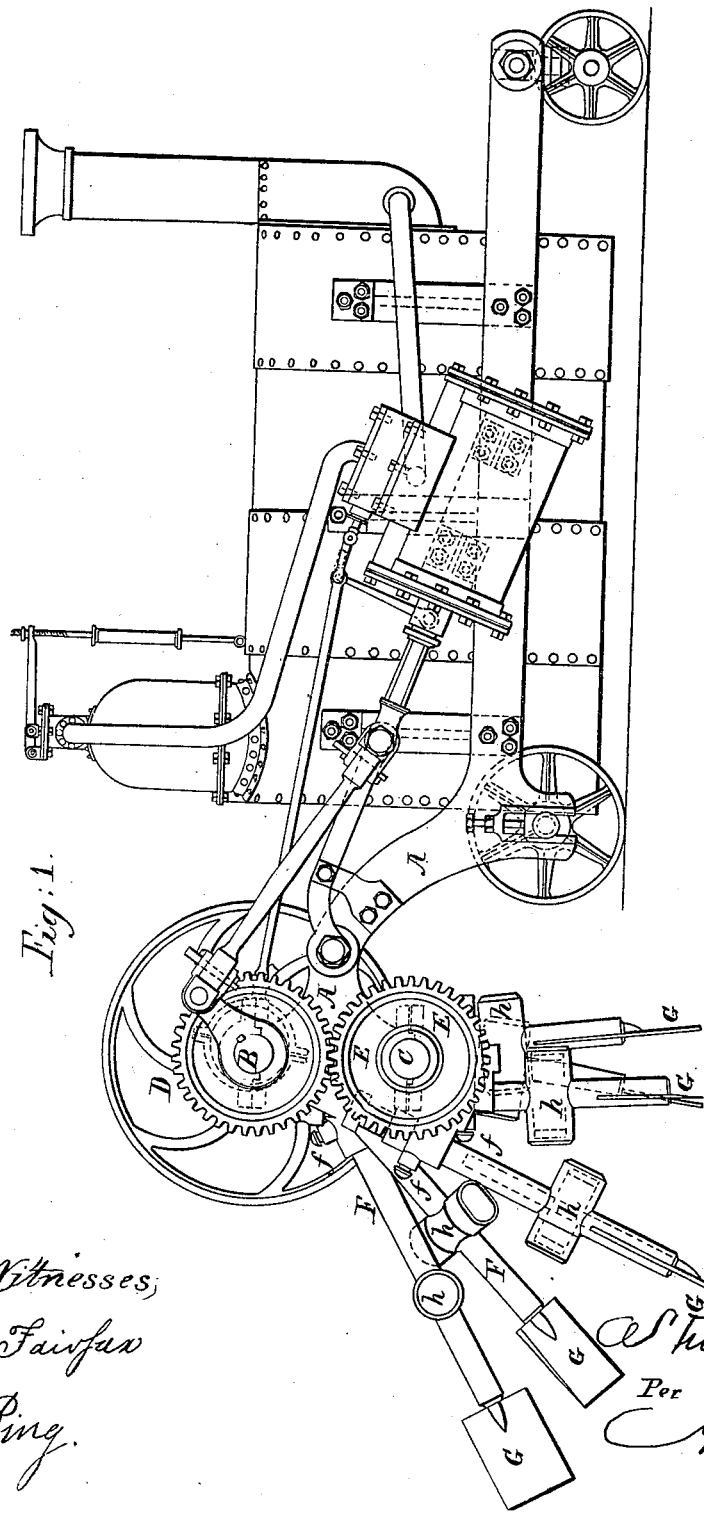

S. GWYNN.
AUTOMATIC SPADER.

No. 29,782. Patented Aug. 21, 1860.

Witnesses;
W. Fairfax
E. Ring.

Inventor;
Stuart Gwynn
Per
A. Pollak
Atty.

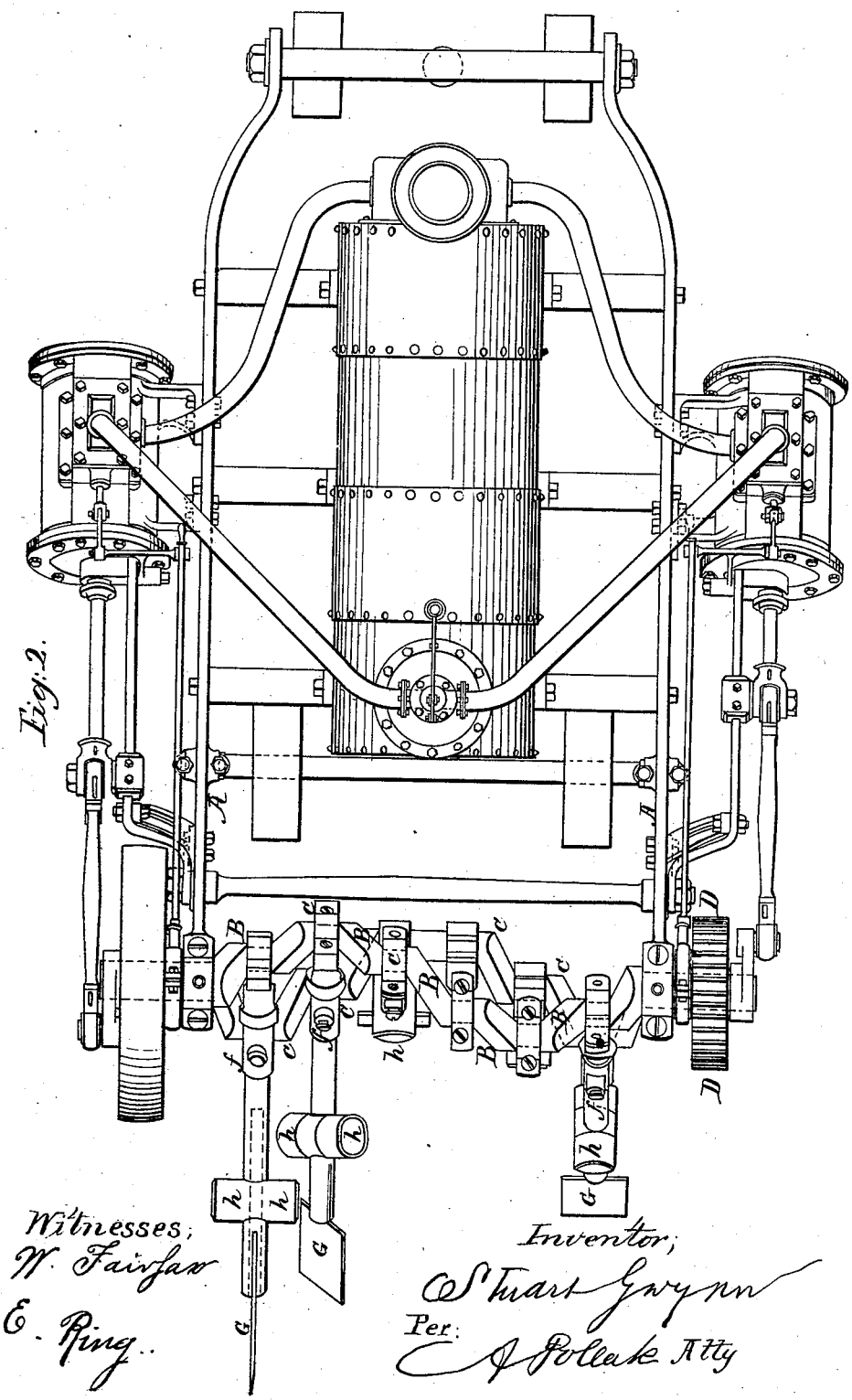

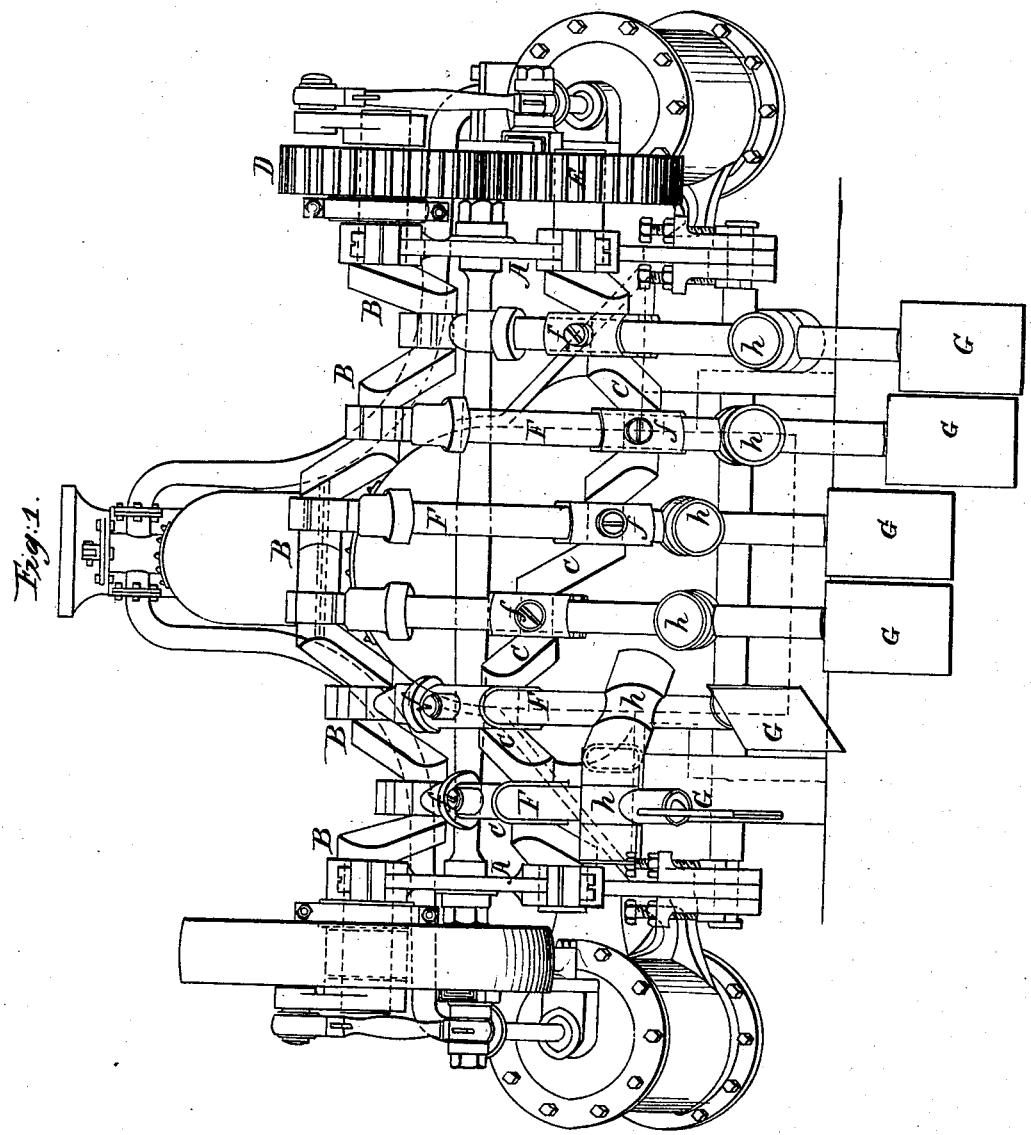

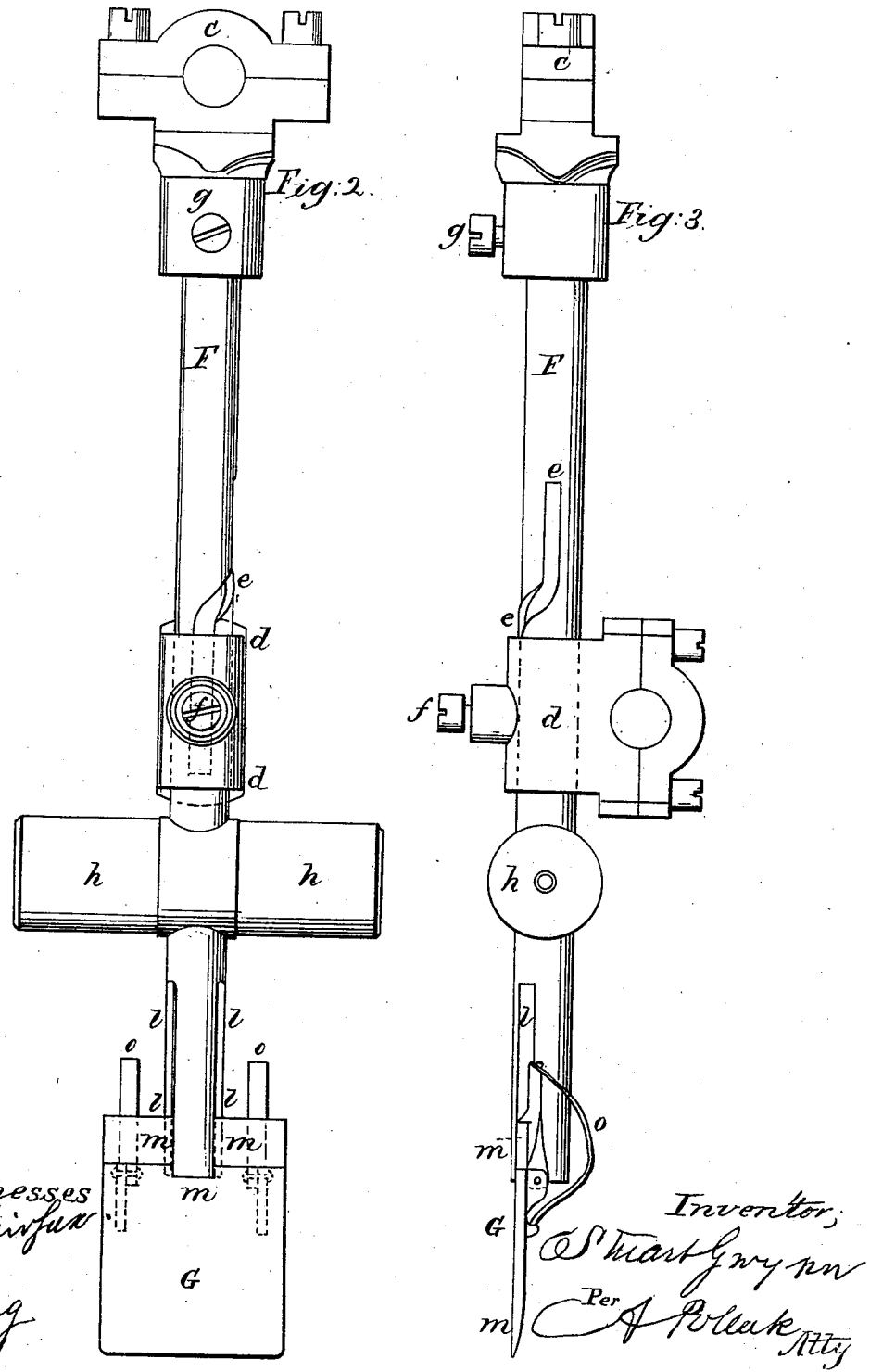

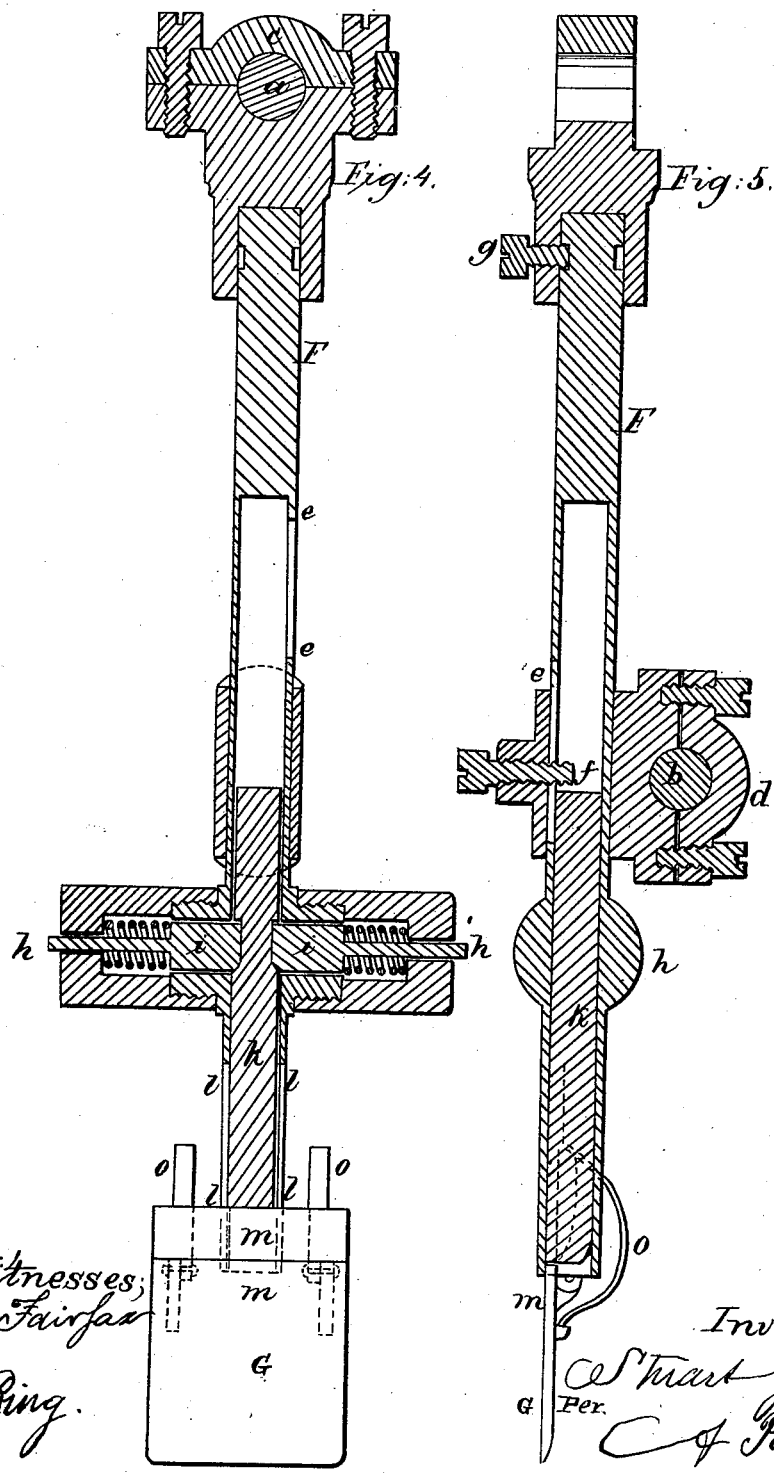

UNITED STATES PATENT OFFICE.

STUART GWYNN, OF NEW YORK, N. Y.

IMPROVEMENT IN SPADING-MACHINES.

Specification forming part of Letters Patent No. 29,782, dated August 28, 1860.

*To all whom it may concern:*

Be it known that I, STUART GWYNN, of New York, in the county of New York and State of New York, have invented a certain new and useful Improvement on Machines for Digging, Excavating, Trucking, &c., and which, taken as a whole, I denominate the "Automatic or Mechanical Spader;" and I do hereby declare that the following, with its accompanying drawings, is a full and clear description thereof, so that others may make and use the same.

In the accompanying drawings, Sheet 1 represents a side elevation and plan of my automatic spader as connected with and operated by a steam traction-engine or locomotive, though of course any other suitable driving or traction and driving power may be used. Sheet 2 represents a back or after end elevation of the same.

The spader is shown as situated in rear of the engine, to which it may be connected by a bracket, A, the engine serving alike to give the spades their individual or digging and delivering action, as also their collective travel over the ground as the work progresses, and likewise to transport them from field to field or from one place to another, as from their place of rest to their place of work. It is designed to work the spades in gangs, and the drawings referred to show a gang as at work; but as the construction and action of each of the spades are similar, only one of the spades will be minutely described in this specification.

When working in a gang of any number of spades the spades may be set to occupy positions at any suitable distance from each other along two many-cranked shafts or axles, B C, arranged the one under the other, athwart the course of the engine's travel or otherwise, and the relative sets and actions of the spades may be such as that they enter the ground and deliver the loose earth successively. These two spade-operating shafts or cranked axles B C may be geared together by spur-wheels D E, so as to operate in unison but in reverse directions to each other, and the one of the said shafts be caused to revolve by a crank and a pitman or by chain or other belt set in motion by the prime mover; or said two shafts may be otherwise driven to revolve in reverse directions to each other. Each spade requires the compound action of two cranks or their equivalents.

In Sheet 2 of the accompanying drawings are shown two of the revolving cranks or wrist-pins, *a b*, arranged the one under the other, to actuate a spade, and connected with the shafts B and C, which revolve in reverse directions to each other.

The spade handle or stock F should be so connected with the boxes *c d*, that are carried by the revolving eccentric or wrist pins *a b*, and in which the wrist-pins turn or play, so that it is capable of axial rotation for a quarter of a circle (more or less) in or on the one box, *c*, and in the other box, *d*, and in addition to this action said stock made to slide or move in direction of its axis, or thereabout, through the last-named box, *d*.

The compound motion communicated to the stock F by the revolving wrist-pins *a b* in contrary directions gives the sliding action to the stock in direction of its length, the stock or handle being restricted from such motion at its junction with one of the boxes *c*; and the turning action of the stock may be produced by a spiral construction of the stock or spiral groove and pin-gear, connected with the other box, *d*, through which the stock slides as well as turns. These two movements of the spade are simultaneous; but the turning motion of the stock is only at a certain interval or intervals during the sliding action of the same, to give the spade its proper dip into and motion out of the earth, and afterward a twist or turn to deliver on one side the loose or uplifted earth, as in spading by hand, or in resemblance thereof.

In Figs. 2, 3, 4, and 5 of Sheet 2 of the drawings are shown exterior elevations and sectional views of one of the spades and parts thereof detached. By reference to these figures it will be seen that the lower portion of the spade-stock F is of a hollow cylindrical construction, with a slot, *e*, partly helical, but mainly straight or parallel with the axis of the stock, for the gear with the stock of the one wrist-pin box *d*, and whereby the spade, with its stock or holder, is guided in its straight course and turned at the required periods, as before named. The gear of the wrist-pin box *d* with the slotted stock is effected by means of a pin, $f$, arranged to enter the slot $e$ of the stock, and to protrude within the hollow interior of the stock, for a purpose hereinafter described. The spade-stock being thus constructed and attached to the revolving wrist-pins or reversely-moving cranks, the spade is caused first to make a downward movement into the earth, then to pass back and simultaneously rise and lift its load, afterward to turn or partly rotate, when the load drops off, and then to resume its original position for entering the earth again.

The one wrist-pin box, $c$, retains the stock from vertical play independent of it by means of a pin, $g$, which is made to enter a groove or neck in the stock; but the axial movement or turning of the stock is not restricted thereby. The spade-stock F is further provided with side boxes, $h\ h$, in which and projecting into the hollow of the stock are bevel-nosed stops $i\ i$, pressed toward each other by adjustable springs, and biting against or over a reduced portion of the spade-shank $k$, which fits in the stock or holder as a stem in a sleeve. The spade-shank and spade or spade-blade G are thus connected with the stock to permit of their longitudinal play up or down relatively to the stock, but are prevented from turning independently of the stock by means of slots $l\ l$ in the latter, within which the spade-blade G fits or crosses.

In ordinary digging or digging against mere earth the stops $i\ i$ hold with sufficient force to prevent the spade-blade and its shank from rising in the stock or holder; but should the spade in its descent with the stock be brought into violent contact with a stone or other intervening obstacle, then the upward pressure induced causes the spade-shank to overcome the hold of the stops on it, and forcing them into the side boxes, $h\ h$, it and the spade-blade rise in the stock or holder, and in thus yielding or working up injury to or breakage of the spade and its operating mechanism is prevented. To bring the spade-blade down again after it has been forced into the stock, and to make such return of the blade and its shank to its normal position automatic, the pin $f$, which is connected with the one wrist-pin box, $d$, and which serves, by its gear with the straight and helical slot $e$, to guide in a straight course and turn the spade with its stock, is also made, by protruding it into the hollow of the stock, to act, on the retreat of the stock or onward of the travel of the lower wrist-pin with its box, on the top of the spade-shank so as to force the latter and the spade-blade down to their place.

I also construct the spade-blade G in sections, $m\ m$, jointed together and provided with springs $o\ o$, and suitable lips or shoulder, so as to give to the blade an articulated character sufficiently rigid to resist ordinary strain, but that will admit of the blade yielding to rocks, stones, or other obstacles in the ground which it may meet with after it has been pushed into the soil, and which, in the backward throw or stroke of the spade relatively to the whole apparatus, and while in the earth or freeing itself therefrom, would be liable to produce injury or breakage.

When it is desired to use the engine or driving-power for other purposes than spading, agricultural or otherwise, the spades can be readily unshipped by simply slacking or taking out the top holding-pin, $g$, to each spade, and then, by sliding or throwing out of gear the one of the two cogged wheels which cause the two cranked shafts A and B to work in unison reversely to each other, the lower spade-operating shaft will be relieved from moving and the full power of the engine made applicable to its intended use other than spading.

I will now enumerate some of the changes that may be made in constructing and using this invention. The spade-blade need not be made of an articulated character, excepting when for working on land where there are many large stones. The throw of the two driving-cranks or wrist-pins that operate the spades may be varied and their relative positions changed. Likewise the slots or their equivalents, which guide and give the turning stroke to the spade-holders, may be differently shaped, so as to more or less change the motions of the spades.

For ordinary field spading or plowing a small locomotive boiler and engine mounted on a platform provided with three broad-faced running-wheels may be used to operate the spades, the front wheel turning by means of a lever to steer the machine, while the after wheels may be driven by gearing. For raising the road-bed of railroads the spades should be hung and operated in positions relatively to the travel of the engine at right angles to those they occupy or are hung in for field-work. A more rapid motion should be given to the spades for road-making than for field-work, and the rotary motion to turn the spades for discharge of the load may in road-making be dispensed with.

In the spades for road-making the shanks should be of varied lengths, the short ones preceding the longer ones, and each succeeding spade being longer until the last is of sufficient length to reach the bottom of the drain or excavation.

For rapid road-making a right and left hand machine may be used—that is, a machine with a gang of spades of varying lengths, as above, mounted on the right in one machine and on the left in the other. Thus one machine makes up the right and the other the left sides of the road simultaneously; or a simple machine may be used, with its spades arranged for making only one side of the road at a time; and after one side of the road for a certain distance has been dug the machine may be crossed over to the other side of the road and be returned, and in returning made to dig that side.

For loading wheelbarrows, carts, cars, or other vehicles, and for deep excavations or trenches for drainage, a single spade only of large size may be used, and the same be formed with hinged sides or otherwise. In trenching for lower drainage the machine, with its spade or spades, may be constructed to rise and lower by means of screws or other devices to facilitate the cutting of deep or shallow trenches. When used for dock, river, or other excavations the machine may be mounted on a pivot-center and made capable of traveling in a sweep, so as to cut or clear any particular shaped or sized place.

A curvilinear reciprocating or other equivalent or suitable motion may take the place of a rotary one for operating the spades.

Having thus described my invention, I claim—

1. The employment, in combination with the spades and for operating them, of double cranks arranged to move in reverse directions and giving a compound action to the spade or spades, essentially as specified.

2. Providing the spade stock or holder with a spring stop or stops so constructed and arranged as to be capable of being thrust away or to one side on the spade in its descent or digging-stroke striking a stone or other intervening obstacle calculated to injure it, and permitting of the yield or rise of the spade therefrom, substantially as shown and described.

3. Constructing and arranging the spade stock or holder, as herein shown and described, with a twist, screw, or helical groove, or the equivalent thereof, so that the spade, in its reciprocating or longitudinal travel, shall, at a certain point or points thereof, be turned and made to assume different positions relatively to the line of cut, essentially as herein set forth.

4. Causing the spade after it has been pushed into its stock or holder, by meeting with an obstacle in its descent, to be automatically returned to its proper position for further work during the retreat of the holder by means of the same device or pin which, in connection with the helical slot in the stock, serves to turn and alter the position of the blade of the spade relatively to the line of cut, essentially as described.

5. Constructing the spade or spade-blade with an articulation-joint, for action when in the soil or when freeing itself therefrom and during the backward thrust or throw of the spade to avoid injury or breakage from stones or other like obstacles in the soil.

In testimony whereof I have signed my name to this specification before two subscribing witnesses.

STUART GWYNN.

Witnesses:
  A. POLLAK,
  R. H. TAPPAN.